(12) United States Patent
Sato et al.

(10) Patent No.: US 8,249,991 B2
(45) Date of Patent: Aug. 21, 2012

(54) CONTENTS REPRODUCTION EXPIRATION MANAGEMENT SYSTEM, CONTENTS REPRODUCTION EXPIRATION MANAGING METHOD, TERMINAL APPARATUS, SERVER APPARATUS, PROGRAM, AND RECORDING MEDIUM FOR MANAGING PERMISSION/NON-PERMISSION OF REPRODUCTION OF CONTENTS

(75) Inventors: Takashi Sato, Tokyo (JP); Kaoru Kijima, Tokyo (JP); Mitsuru Toriyama, Chiba (JP); Azumi Iida, Saitama (JP); Takashi Kinoshita, Kanagawa (JP); Katsuyuki Kanetsuna, Tokyo (JP)

(73) Assignee: Sony Corporation, Tokyo (JP)

( * ) Notice: Subject to any disclaimer, the term of this patent is extended or adjusted under 35 U.S.C. 154(b) by 1641 days.

(21) Appl. No.: 10/549,138

(22) PCT Filed: Mar. 10, 2004

(86) PCT No.: PCT/JP2004/003113
§ 371 (c)(1),
(2), (4) Date: Sep. 15, 2005

(87) PCT Pub. No.: WO2004/086232
PCT Pub. Date: Oct. 7, 2004

(65) Prior Publication Data
US 2006/0185023 A1     Aug. 17, 2006

(30) Foreign Application Priority Data

Mar. 26, 2003   (JP) ................................ 2003-084436

(51) Int. Cl.
*G06F 21/00* (2006.01)
(52) U.S. Cl. .......... 705/51; 709/220; 709/229; 709/231; 709/225; 713/193; 713/156; 380/201; 380/277; 726/26; 726/31; 726/28; 717/171; 705/50; 705/52; 705/54; 705/66; 705/56; 705/78; 705/59

(58) Field of Classification Search ..................... 726/27
See application file for complete search history.

(56) References Cited

U.S. PATENT DOCUMENTS
5,825,876 A * 10/1998 Peterson, Jr. .................... 705/52
(Continued)

FOREIGN PATENT DOCUMENTS
EP      0 766 165 A2    4/1997
(Continued)

OTHER PUBLICATIONS

Office Action mailed Oct. 25, 2010, in Korean Patent Application No. 10-2005-7017045.
(Continued)

*Primary Examiner* — Nathan Flynn
*Assistant Examiner* — Bryan Wright
(74) *Attorney, Agent, or Firm* — Oblon, Spivak, McClelland, Maier & Neustadt, L.L.P.

(57) ABSTRACT

Peculiar identification information to identify a recording medium itself is recorded onto the recording medium on which contents information as a target of a reproduction deadline management is recorded. At least the identification information recorded on the recording medium as mentioned above is read by a terminal apparatus and transmitted to a server apparatus. In the server apparatus, a reproduction possible deadline of the contents information recorded on the recording medium is managed on the basis of reproduction possible deadline information indicative of the reproduction possible deadline regarding the contents information recorded on the recording medium on the basis of at least the identification information.

Thus, when the reproduction deadline of the contents recorded on the recording medium is managed, the operation for allowing the server apparatus side to set registration information such as personal information or the like of the user as in the conventional system is unnecessary.

12 Claims, 10 Drawing Sheets

0 (CONTENTS REPRODUCTION DEADLINE MANAGEMENT SYSTEM)

U.S. PATENT DOCUMENTS

| | | | |
|---|---|---|---|
| 6,034,832 A * | 3/2000 | Ichimura et al. | 360/60 |
| 7,062,254 B2 * | 6/2006 | Hovestadt et al. | 455/412.1 |
| 2001/0037452 A1 * | 11/2001 | Go et al. | 713/168 |
| 2002/0013940 A1 * | 1/2002 | Tsukamoto et al. | 725/5 |
| 2002/0036800 A1 * | 3/2002 | Nozaki et al. | 358/1.15 |
| 2002/0085714 A1 * | 7/2002 | Inoha et al. | 380/201 |
| 2002/0114461 A1 | 8/2002 | Shimada et al. | |
| 2002/0120722 A1 | 8/2002 | Kutaragi et al. | |
| 2002/0143902 A1 * | 10/2002 | Chung et al. | 709/219 |

FOREIGN PATENT DOCUMENTS

| | | |
|---|---|---|
| EP | 1 229 476 A2 | 8/2002 |
| JP | 6-223040 | 8/1994 |
| JP | 6-233040 | 8/1994 |
| JP | 10-198558 | 7/1998 |
| JP | 10-207779 | 8/1998 |
| JP | 10-208388 | 8/1998 |
| JP | 11-232094 | 8/1999 |
| JP | 11-296437 | 10/1999 |
| JP | 2002-092226 | 3/2002 |
| JP | 2002-325224 | 11/2002 |
| JP | 2002-328846 | 11/2002 |
| JP | 2002-334511 | 11/2002 |

OTHER PUBLICATIONS

Supplemental European Search Report issued Nov. 7, 2011, in European Patent Application No. 04719108.5.

* cited by examiner

Fig. 6

| RANGE OF MEDIA ID | CONTENTS No. | DEADLINE INFORMATION (THE NUMBER OF ELAPSED DAYS FROM FIRST ACCESSING DATE) |
|---|---|---|
| ID0001 ~ ID1000 | NO.1 | 10 |
| | NO.2 | 15 |
| | NO.3 | 20 |
| ID1001 ~ ID2500 | NO.1 | 10 |
| | NO.2 | 20 |
| | NO.3 | 25 |
| | NO.4 | 30 |
| ...... | ...... | ...... |

EXAMPLE OF SET DEADLINE INFORMATION

Fig. 7

| MEDIA ID | CONTENTS No. | FIRST REQUESTING DATE |
|---|---|---|
| ID0001 | NO.1 | 2003-01-31 |
|  | NO.2 | 2003-02-05 |
|  | NO.3 | 2003-02-06 |
| ID1001 | NO.1 | 2003-02-08 |
|  | NO.2 | 2003-02-09 |
|  | NO.3 | 2003-02-09 |
| ⋮ | ⋮ | ⋮ |

EXAMPLE OF DEADLINE MANAGEMENT INFORMATION

Fig. 8

| RANGE OF MEDIA ID | KEY INFORMATION (2ND LEVEL) | CONTENTS No. | KEY INFORMATION (1ST LEVEL) |
|---|---|---|---|
| ID0001 ~ ID1000 | | NO.1 | |
| | | NO.2 | |
| | | NO.3 | |
| ID1001 ~ ID2500 | | NO.1 | |
| | | NO.2 | |
| | | NO.3 | |
| | | NO.4 | |
| ...... | ...... | ...... | ...... |

EXAMPLE OF KEY DATABASE

CONTENTS REPRODUCTION EXPIRATION MANAGEMENT SYSTEM, CONTENTS REPRODUCTION EXPIRATION MANAGING METHOD, TERMINAL APPARATUS, SERVER APPARATUS, PROGRAM, AND RECORDING MEDIUM FOR MANAGING PERMISSION/NON-PERMISSION OF REPRODUCTION OF CONTENTS

TECHNICAL FIELD

The invention relates to a contents reproduction deadline management system for managing a deadline regarding permission/non-permission of reproduction with respect to, for example, contents which is recorded onto a recording medium and relates to a contents reproduction deadline managing method, a terminal apparatus, a server apparatus, a program, and a recording medium for such a system.

BACKGROUND ART

For example, from a viewpoint of copyright protection or the like, there is a system for managing a deadline about permission/non-permission of reproduction with respect to contents recorded on a media.

That is, for example, the reproduction of the contents is permitted within a predetermined period and, after the elapse of such a period, the reproduction is not permitted. Thus, monitoring of the contents by the user is enabled within the predetermined period and, after the passing of the deadline, for example, the user is instructed to newly purchase the contents at a normal price.

As a system for enabling the contents to be monitored within the predetermined period and, there after, letting the contents be purchased again as mentioned above, for example, there is a system using the following system.

First, the encrypted contents is recorded as a media as mentioned above. A key for decrypting the encrypted contents is given for a predetermined period, thereby enabling the contents to be monitored for the predetermined period.

In such a system, when the contents recorded in the media as mentioned above is reproduced, for example, the user accesses a predetermined server with the media loaded into a reproducing apparatus. The server side returns key information to decrypt the encryption in response to the access for the predetermined period, thereby enabling the contents to be reproduced on the reproducing apparatus side.

In this instance, to permit the reproduction of the contents for as certain predetermined period as mentioned above, deadline information of each contents of each media has to be managed on the server side. That is, a mechanism which can distinguish, among the contents whose reproduction is required of which contents has passed the deadline and which contents is not is necessary.

For this purpose, according to the conventional technique, first, at the time of the first reproducing request of the contents, the user is instructed to set and register predetermined information (name, date of birth, address, telephone number, occupation, etc.) into the server and a correspondence between the contents and its deadline is obtained according to the registration information on the server side.

Corresponding to the completion of the registration, first, the key for decryption is returned to the reproducing apparatus side, thereby permitting the reproduction of the contents. Further, in this instance, reference time for management of the contents deadline is set into the reproducing apparatus side from the server side and, after that, each time the reproducing request of the contents is issued, the deadline of the contents is monitored according to such reference time set into the reproducing apparatus side.

According to the conventional technique, as mentioned above, by making the registration information such as personal information or the like of the user set on the server side at the time of the first reproducing request, the correspondence between the contents recorded in the media held by the user and the deadline information corresponding to such contents is obtained.

In addition to it, by setting the reference time to the reproducing apparatus side at the time of the first reproducing request, the deadline of the contents is managed after that on the basis of the reference time which is presented by the reproducing apparatus side at the time of accessing.

However, such a conventional technique has the following problems.

First, in the conventional technique as mentioned above, it is indispensable to accurately maintain the reference time which is set by the server side on the reproducing apparatus side. For this purpose, some clock function has to be provided for the reproducing apparatus side. However, it is technically difficult to accurately maintain and manage such a clock function and such a difficulty influences whether or not such a system can be accomplished.

Also in this instance, such a clock on the reproducing apparatus side can be often arbitrarily adjusted by the user. There is, consequently, a fear that the reference time set by the server is changed and it also influences whether or not such a system can be accomplished.

In the conventional technique as mentioned above, to allow the user to receive services, first, the personal information (name, date of birth, address, telephone number, occupation, etc.) for authentication is registered into the server side.

This causes, for example, the following possibility when there is a defect in an information management system of the side of administrating the server; that is, a possibility that such user's personal information leaks to the outside and it develops to a social problem.

Since the user has to register the personal information or the like in order that the reproduction deadline of the contents is managed as mentioned above, the following inconvenience occurs.

That is, for example, assuming that there is a reproducing apparatus in which the user registration has already been made, and if the user buys a new reproducing apparatus aside from the existing reproducing apparatus and intends to receive services by the reproducing apparatus after the purchase, in spite of the fact that the user registration has already been made once, the user registration has to be performed again to the server with respect to the new reproducing apparatus.

That is, according to the foregoing conventional technique as mentioned above, when the user intends to receive the services by using another reproducing apparatus, the above problem forces the user to have troublesomeness of the new registration and he is heavily burdened.

Since such troublesomeness is compelled, in the conventional technique as mentioned above, it is difficult to freely access the server apparatus and receive the services after exchanging the reproducing apparatus.

Further, according to such a conventional technique, since the deadline of each contents is managed according to the reference time set into the reproducing apparatus side as mentioned above, for example, in the case where the same media is loaded into another reproducing apparatus and a reproducing request is newly made to the server side, new reference time can be set in such a reproducing apparatus.

That is, there is such a problem that since the reproduction deadline of the contents can be arbitrarily extended, the deadline management of the contents is not completed in dependence on the conventional system.

Counter measuring the problems of such a conventional technique, the invention shown in JP-A-2002-8115 is constructed in such a manner that prepaid information is preliminarily stored into the media and, upon downloading of the contents, the server side executes a charging process on the basis of the prepaid information.

According to the technique of JP-A-2002-8115, ID information peculiar to each media and prepaid money amount information are recorded as prepaid information.

According to the technique, since each media can be identified by the peculiar ID information, in this case, when each user is identified on the server side, the operation for allowing the user to set the registration information such as personal information and the like as mentioned above is unnecessary.

Since the contents of a money amount over the prepaid money amount cannot be downloaded, the copyright can be effectively protected.

However, since the technique disclosed in JP-A-2002-8115 is made on the assumption that the contents is downloaded to the blank media, the reproduction deadline of the contents which has previously been recorded in the media as mentioned in the above conventional technique cannot be managed.

DISCLOSURE OF INVENTION

To solve the above problems, according to the invention of claim 1, there is provided a contents reproduction deadline management system comprising a terminal apparatus and a server apparatus, wherein the terminal apparatus has terminal side communicating means for enabling information communication with the server apparatus through a predetermined network, reading means for reading information from a recording medium on which one or more contents information and peculiar identification information to identify the recording medium itself have been recorded, and reproduction control means for allowing the terminal side communicating means to transmit at least the identification information read by the reading means to the server apparatus and controlling the reproducing operation of the contents information recorded on the recording medium on the basis of reproducing operation control information which is received from the server apparatus and corresponds to the transmitted identification information, and the server apparatus has server side communicating means for enabling information communication with the terminal apparatus through the predetermined network, information storing means in which reproduction possible deadline information showing a reproduction possible deadline of the contents information recorded on the recording medium on the basis of at least the identification information is stored, discriminating means for discriminating whether or not the reproduction possible deadline of the contents information recorded on the recording medium has passed on the basis of the identification information which is received by the server side communicating means and the reproduction possible deadline information stored in the information storing means, and communicating operation control means for controlling the server side communicating means in such a manner that if it is determined by a discrimination result of the discriminating means that the reproduction possible deadline is not come yet, reproducing operation control information to enable the reproduction of the contents information is transmitted and, if it is determined that the reproduction possible deadline has passed, the reproducing operation control information to inhibit the reproduction of the contents information on the terminal apparatus side is transmitted.

According to the invention of claim 10, there is provided a contents reproduction deadline managing method of allowing a terminal apparatus to execute:

a reading process for reading information from a recording medium on which one or more contents information and peculiar identification information to identify the recording medium itself have been recorded;

a transmitting process for transmitting at least the identification information read by the reading process to the server apparatus;

a discriminating process for discriminating in the server apparatus whether or not a reproduction possible deadline of the contents information recorded on the recording medium has passed on the basis of reproduction possible deadline information indicative of a reproduction possible deadline of the contents information which is recorded on the recording medium and the identification information which is received from the terminal information;

a communicating operation control process for executing control in such a manner that if it is determined by a discrimination result of the discriminating process that the reproduction possible deadline is not come yet, the reproducing operation control information to enable the reproduction of the contents information is transmitted from the server apparatus to the terminal apparatus and, if it is determined that the reproduction possible deadline has passed, the reproducing operation control information to inhibit the reproduction of the contents information on the terminal apparatus side is transmitted from the server apparatus to the terminal apparatus; and a reproduction control process for controlling the reproducing operation of the contents information recorded on the recording medium on the basis of the reproducing operation control information which is received from the server apparatus.

According to the invention of claim 11, there is provided a terminal apparatus in a contents reproduction deadline management system constructed by the terminal apparatus and a server apparatus for managing reproduction of contents recorded on a recording medium on the basis of peculiar identification information to identify the recording medium itself and reproduction possible deadline information indicative of a reproduction possible deadline, comprising:

communicating means for enabling information communication with the server apparatus through a predetermined network;

reading means for reading information from the recording medium on which one or more contents information and the peculiar identification information to identify the recording medium itself have been recorded;

receiving means for allowing at least the identification information read by the reading means to be transmitted to the server apparatus by the communicating means and receiving reproducing operation control information to control the reproducing operation of the contents recorded on the recording medium identified by the identification information on the basis of the transmitted identification information; and reproduction control means for executing the reproduction of the contents when the reproducing operation control information received by the receiving means is the reproducing operation control information to permit the reproduction of the contents and inhibiting the reproduction of the contents when the reproducing operation control information is the reproducing operation control information to inhibit the reproduction of the contents.

According to the invention of claim 12, there is provided a program which is executed by a terminal apparatus in a contents reproduction deadline management system constructed by the terminal apparatus and a server apparatus, comprising:

a reading process for reading information from a recording medium on which one or more contents information and peculiar identification information to identify the recording medium itself have been recorded;

a receiving process for allowing at least the identification information read by the reading process to be transmitted to the server apparatus and receiving reproducing operation control information to control the reproducing operation of the contents recorded on the recording medium identified by the transmitted identification information; and a reproduction control process for executing the reproduction of the contents when the reproducing operation control information received by the receiving process is the reproducing operation control information to permit the reproduction of the contents and inhibiting the reproduction of the contents when the reproducing operation control information is the reproducing operation control information to inhibit the reproduction of the contents.

According to the invention of claim 13, there is provided a server apparatus in a contents reproduction deadline management system constructed by a terminal apparatus and the server apparatus, comprising:

communicating means for enabling information communication with the terminal apparatus through a predetermined network;

information storing means for storing reproduction possible deadline information indicative of a reproduction possible deadline of contents information which is recorded on a recording medium on the basis of at least identification information which is recorded on the recording medium on which one or more contents information and peculiar identification information to identify the recording medium itself have been recorded;

discriminating means for discriminating whether or not the reproduction possible deadline of the contents information recorded on the recording medium has passed on the basis of the identification information which is read and transmitted by the terminal apparatus and received by the communicating means and the reproduction possible deadline information stored in the information storing means; and communicating operation control means for controlling the communicating means in such a manner that if it is determined by a discrimination result of the discriminating means that the reproduction possible deadline is not come yet, reproducing operation control information to enable the reproduction of the contents information is transmitted and, if it is determined that the reproduction possible deadline has passed, the reproducing operation control information to inhibit the reproduction of the contents information on the terminal apparatus side is transmitted.

According to the invention of claim 14, there is provided a program which is executed by a server apparatus in a contents reproduction deadline management system constructed by a terminal apparatus and the server apparatus, comprising:

a discriminating process for discriminating whether or not a reproduction possible deadline of contents information recorded on a recording medium has passed on the basis of at least identification information which is read and transmitted by the terminal apparatus from the recording medium on which one or more contents information and peculiar identification information to identify the recording medium itself have been recorded and reproduction possible deadline information indicative of the reproduction possible deadline of the contents information recorded on the recording medium on the basis of at least the identification information; and a communicating operation control process for controlling the communicating operation in such a manner that if it is determined by a discrimination result of the discriminating process that the reproduction possible deadline is not come yet, reproducing operation control information to enable the reproduction of the contents information is transmitted and, if it is determined that the reproduction possible deadline has passed, the reproducing operation control information to inhibit the reproduction of the contents information on the terminal apparatus side is transmitted.

According to the invention of claim 15, there is provided a recording medium on which a program which is executed by a terminal apparatus in a contents reproduction deadline management system comprising the terminal apparatus and a server apparatus has been recorded, wherein the program comprises:

a reading process for reading information from the recording medium on which one or more contents information and peculiar identification information to identify the recording medium itself have been recorded;

a receiving process for allowing at least the identification information read by the reading process to be transmitted to the server apparatus and receiving reproducing operation control information to control the reproducing operation of contents recorded on the recording medium which is identified by the identification information on the basis of the transmitted identification information; and a reproduction control process for executing the reproduction of the contents when the reproducing operation control information received by the receiving process is the reproducing operation control information to permit the reproduction of the contents and inhibiting the reproduction of the contents when the reproducing operation control information is the reproducing operation control information to inhibit the reproduction of the contents.

According to the invention of claim 16, there is provided a recording medium on which a program which is executed by a server apparatus in a contents reproduction deadline management system constructed by a terminal apparatus and the server apparatus has been recorded, wherein the program comprises:

a discriminating process for discriminating whether or not a reproduction possible deadline of contents information recorded on the recording medium has passed on the basis of at least identification information which is read and transmitted by the terminal apparatus from the recording medium on which one or more contents information and peculiar identification information to identify the recording medium itself have been recorded and reproduction possible deadline information indicative of a reproduction possible deadline of the contents information recorded on the recording medium on the basis of at least the identification information; and a communicating operation control process for controlling the communicating operation in such a manner that if it is determined by a discrimination result of the discriminating process that the reproduction possible deadline is not come yet, reproducing operation control information to enable the reproduction of the contents information is transmitted and, if it is determined that the reproduction possible deadline has passed, the reproducing operation control information to inhibit the reproduction of the contents information on the terminal apparatus side is transmitted.

BRIEF DESCRIPTION OF DRAWINGS

FIG. 6 is a data structure diagram showing an example of a structure of set deadline information.

FIG. 7 is a data structure diagram showing an example of a structure of deadline management information.

FIG. 8 is a data structure diagram showing an example of a structure of a key database.

BEST MODE FOR CARRYING OUT THE INVENTION

Figure 1:
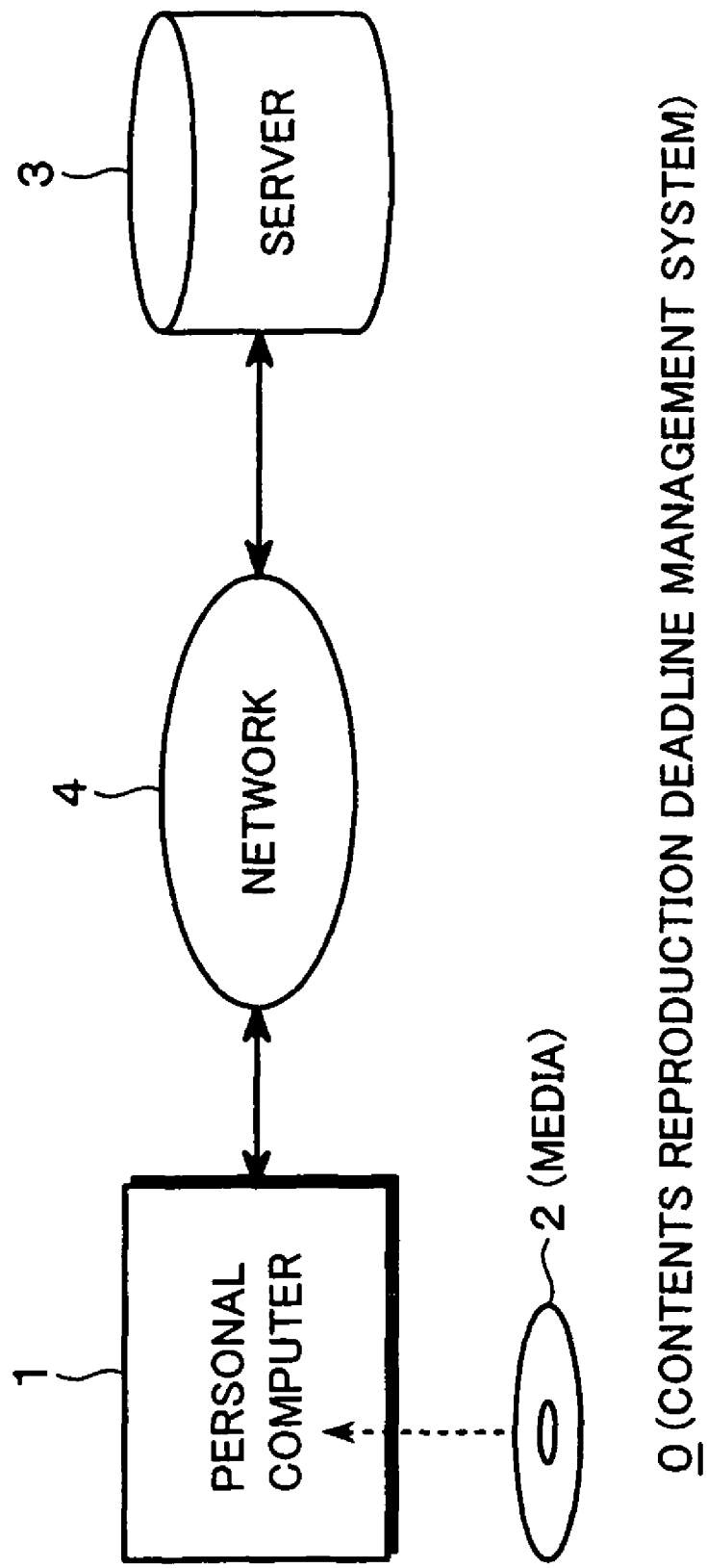
FIG. 1 is a diagram showing an outline of a contents reproduction deadline management system according to an embodiment of the invention.

An embodiment of the invention will be described hereinbelow. It is assumed that the explanation will be made in the following order.
1. System outline
2. Data structure on recording medium
3. Constructional example of terminal apparatus
4. Constructional example of server apparatus
5. Deadline information
6. Operation outline of system
7. Processing operation
1. System Outline FIG. 1 is a diagram showing an outline of a contents reproduction deadline management system 0 according to an embodiment of the invention.

First, in the diagram, the contents reproduction deadline management system 0 of the embodiment is constructed by at least a personal computer 1 as a terminal apparatus and a server 3 as a server apparatus.

In this case, the personal computer 1 and the server 3 can make data communication through, for example, Internet as a network 4 (all of them are shown). Mutual data communication can be made between the personal computer 1 and the server 3.

A media 2 (shown) is a recording medium whose use is presumed in the contents reproduction deadline management system 0. As a media 2 in this case, for example, a disk-shaped recording medium such as CD (Compact Disc), MD (Mini Disc: magnetooptic disc), DVD (DigitalVersatile Disc), or the like is presumed. A structure of data which is recorded on the media 2 is as shown in FIG. 2.

2. Data Structure on Recording Medium

Figure 2:
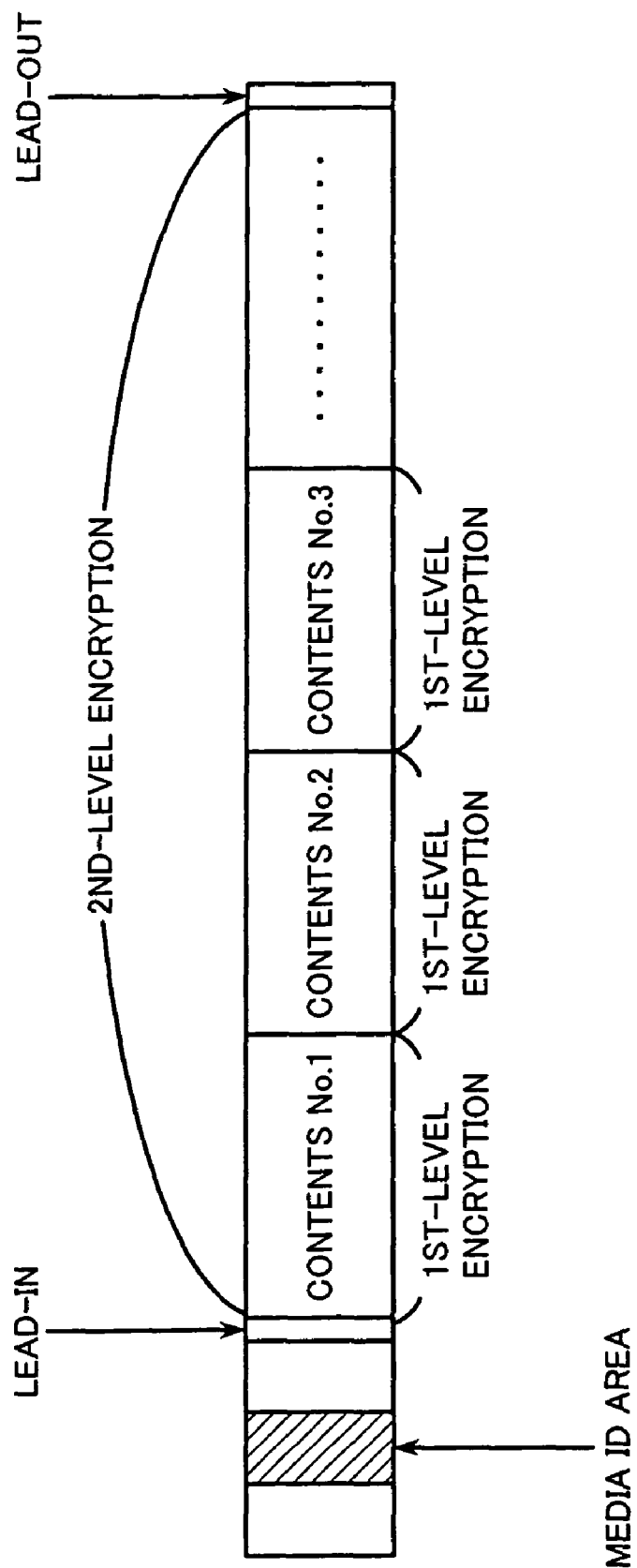
FIG. 2 is a data structure diagram showing an example of a structure of data which is recorded on a media 2.

FIG. 2 is a diagram for explaining a data structure of data which is recorded on the media 2 shown in FIG. 1.

In FIG. 2, first, to the media 2 of the embodiment, a media ID is recorded into an area of a further inner rim side than a lead-in area on the disc as shown in the diagram.

The media ID is identification information that is peculiar to each media 2 and has previously been allocated so as to be peculiar to each media 2. Since the peculiar media ID has been allocated to each media 2 as mentioned above, even in the media 2 of the same title on which the same contents is recorded, they can be distinguished by the media ID.

Such a media ID is recorded so that a recording mark is formed on a protective film in the area of the further inner rim side than the lead-in area on the disc as mentioned above.

As is well-known, in the disk-shaped recording medium, particularly, in the disc in the CD format, discrimination information to discriminate a ROM (Read Only Memory) disc/R (Recordable) disc has been formed on the protective film in the area of the further inner rim side than the lead-in area. When the disc is loaded, a driving side reads the discrimination information and discriminates the ROM/R type of the disc on the basis of it.

In the embodiment, it is assumed that a data recording area of a predetermined number of bytes is provided for an empty area of the area where the discrimination information is recorded and the media ID is recorded into such an area. By recording such an media ID, the media ID can be read out on the driving side in a manner similar to the discrimination information of ROM/R.

In this case, by recording the information of the media ID to the protective film on the disc as mentioned above, the media ID is recorded as unrewritable information.

In FIG. 2, it is presumed that one or more contents are recorded onto the media 2 as shown in the diagram. In this case, it is presumed that AV data by, for example, a video image or an audio sound is recorded as those contents.

To the contents which is recorded onto the media 2 as mentioned above, encryption by the first level is performed on each contents unit basis as shown in the diagram and encryption by the second level is further performed to the whole area where the contents of the media 2 is recorded.

That is, the double encrypting process has been performed to the contents data recorded onto the media 2, thereby enhancing security.

In this case, it is presumed that the encryption of the second level to the whole contents is performed to every media 2 of the same title on the basis of a same key.

In other words, the whole contents recorded in the media 2 of the same title is encrypted on the basis of the same key.

It is presumed that, although the encryption by the first level in this case is similarly made on the basis of the same key with respect to the same contents recorded onto the media of the same title, the encryption by different keys is made to the different contents.

That is, for example, in the contents of the contents Nos. 1, 2, and 3 shown in FIG. 2, although the encryption by the same key is made to the media of the same title, the different encryption keys are used for the contents of the contents Nos. 1, 2, and 3.

Although the case where the encryption of the first level and the encryption of the second level are made by using the same encryption key for every same title has been mentioned above as an example, in place of such an example, the encryption key can be changed, for example, every media ID, that is, every medium of the media 2.

Although the encryption by the different keys has been made every contents as encryption of the first level here, in place of such an example, the respective contents can be also encrypted by using the same encryption key.

Although the case where the media 2 is the disk-shaped recording medium as mentioned above has been described here, another recording medium such as a memory card or the like for recording data by a semiconductor memory can be also used. Also in this case, it is preferable that the media ID as identification information as mentioned above is recorded into an area which is formed as an unrewritable area in the memory area and corresponds to the area of the inner rim than the lead-in area mentioned above.

3. Constructional Example of Terminal Apparatus

Figure 3:
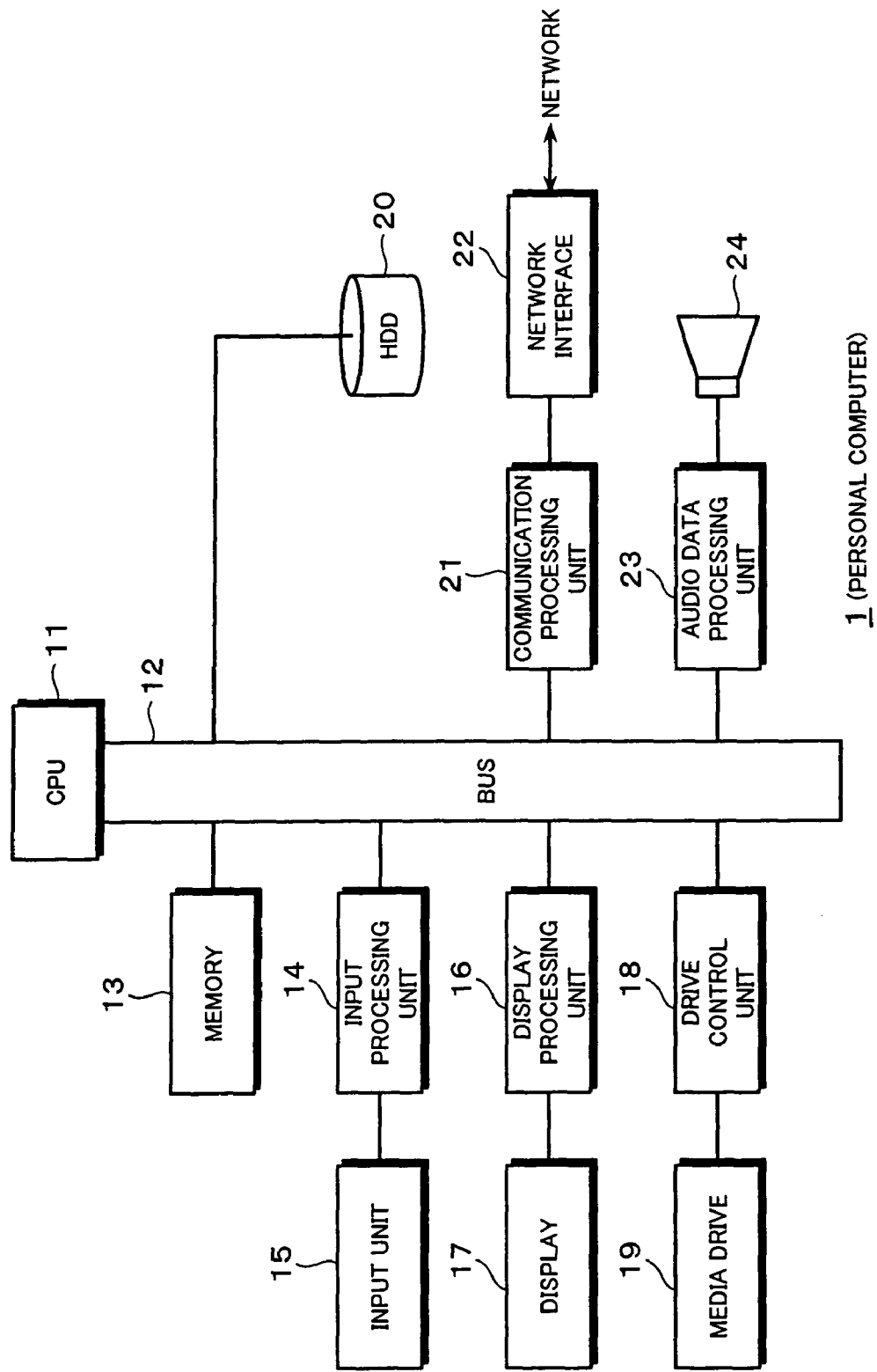
FIG. 3 is a block diagram showing an example of an internal construction of a terminal apparatus in the embodiment of the invention.

FIG. 3 is a block diagram showing an example of an internal construction of the personal computer 1 shown in FIG. 1.

First, as a drive functioning unit regarding the media 2, a media drive 19 corresponding to a desired recording media such as CD, MD, CD-ROM, CD-R, CD-RW (ReWritable), DVD, memory card, or the like is provided for the personal computer 1 in the embodiment. The contents recorded in the corresponding media can be reproduced. As data reproduced by the media drive 19, for example, the audio data is supplied to an audio data processing unit 23 (shown), a reproducing process is executed here, and an audio sound is generated from a speaker 24. A display processing unit 16 drives a display 17 on the basis of the result of the signal processes, so that the video data is displayed.

In FIG. 3, a CPU 11 (shown) controls the whole personal computer 1 and executes an arithmetic operating process on the basis of an activated program. For example, it executes the inputting/outputting operation to the user, storage of a data file onto an HDD 20, and creation, updating, and the like of management information.

Particularly, in the case of the embodiment, when a reproducing request for the contents recorded on the media 2 loaded in the media drive 19 is made, the CPU 11 executes a process to transmit the media ID read out of the media 2 to the server 3. For example, the CPU 11 also executes a process to decrypt the contents recorded on the media 2 or the like on the basis of the key information received by the server 3. Those processing operations as an embodiment will be described hereinafter.

The CPU 11 transmits and receives a control signal and data to/from each unit through a bus 12 (shown).

A memory unit 13 is representatively shown as a memory such as RAM, ROM, flash memory, and the like which are used for the processes by the CPU 11.

An operating program, a program loader, and the like of the CPU 11 are stored in the ROM in the memory unit 13. Various arithmetic operation coefficients, parameters which are used in the program, and the like are stored in the flash memory in the memory unit 13.

A data area and a task area which are used when the program is executed are temporarily assured in the RAM in the memory unit 13.

The storage of the data file and the creation, updating, and the like of the management information are executed on the HDD 20 under control of the CPU 11 as mentioned above. In the case of the embodiment, a contents reproduction deadline managing program (not shown) which is used for the CPU 11 to execute the processing operations shown in FIGS. 9 and 10, which will be explained hereinafter, has also been stored in the HDD 20.

An input unit 15 is a keyboard and a mouse, a remote commander, or another input device (which are not shown) provided for the personal computer 1. The user inputs various operations and data by using the input unit 15.

A predetermined process is executed by an input processing unit 14 to information inputted by the input unit 15 and the processed information is sent to the CPU 11 as an input of the operation or data. The CPU 11 executes necessary arithmetic operations and control in correspondence to the inputted information.

The media drive 19 is constructed so that it can execute the reproducing operation in correspondence to the media 2. For example, in the case of corresponding to the CD as a media 2, for example, an optical head, a spindle motor, a reproduction signal processing unit, a servo circuit, and the like are provided for the media drive 19.

A drive control unit 18 controls the reproducing operation, accessing operation, and the like for the media 2 in the media drive 19. For example, when the user executes the reproducing operation to the loaded media 2 through the input unit 15, the CPU 11 instructs the drive control unit 18 to reproduce the media 2. Thus, the drive control unit 18 controls the media drive 19 so as to execute the reproduction/access.

The media drive 19 sends the read-out reproduction data to the bus 12 through the drive control unit 18.

Under the control of the CPU 11, the audio data processing unit 23 executes a sound field process such as equalization or the like and processes such as sound volume adjustment, D/A conversion, amplification, and the like to the inputted audio data and outputs the processed data through the speaker unit 24.

For example, when the audio data read out by the media drive 19 is reproduced, the audio data is processed in the audio data processing unit 23 and, thereafter, outputted through the speaker unit 24.

The display 17 is a display device such as a liquid crystal panel or the like and displays various information to the user.

For example, when the CPU 11 supplies display information to the display processing unit 16 in accordance with various operating modes, an input state, and a communicating state, the display processing unit 16 allows the display 17 to execute the displaying operation on the basis of the supplied display data.

For example, when the video data is reproduced, the media drive 19 executes signal processes about the reproduction data and drives the display 17 on the basis of the obtained signal, thereby allowing the display 17 to display a video image.

A communication processing unit 21 executes an encoding process of the transmission data and a decoding process of the reception data under the control of the CPU 11.

A network interface 22 transmits the transmission data encoded by the communication processing unit 21 to a predetermined apparatus, for example, the server 3 through the network 4 shown in FIG. 1. A signal transmitted from an external apparatus such as a server 3 or the like through the network 4 is transmitted/received to/from the communication processing unit 21.

The communication processing unit 21 transfers the received information to the CPU 11.

The construction of the personal computer 1 is not limited to that of FIG. 1 but a variety of constructions are considered.

For example, an interface with a peripheral device according to a communicating system such as USB, IEEE1394, or the like can be also provided. A terminal which is used to connect a microphone or external headphones, a video output terminal corresponding to the reproduction of a DVD, a line connecting terminal, an optical digital connecting terminal, and the like can be also provided.

It is also possible to construct in such a manner that a PCMCIA slot or the like is formed and data can be transmitted and received to/from an external information processing apparatus or an audio apparatus.

4. Constructional Example of Server Apparatus

Figure 4:
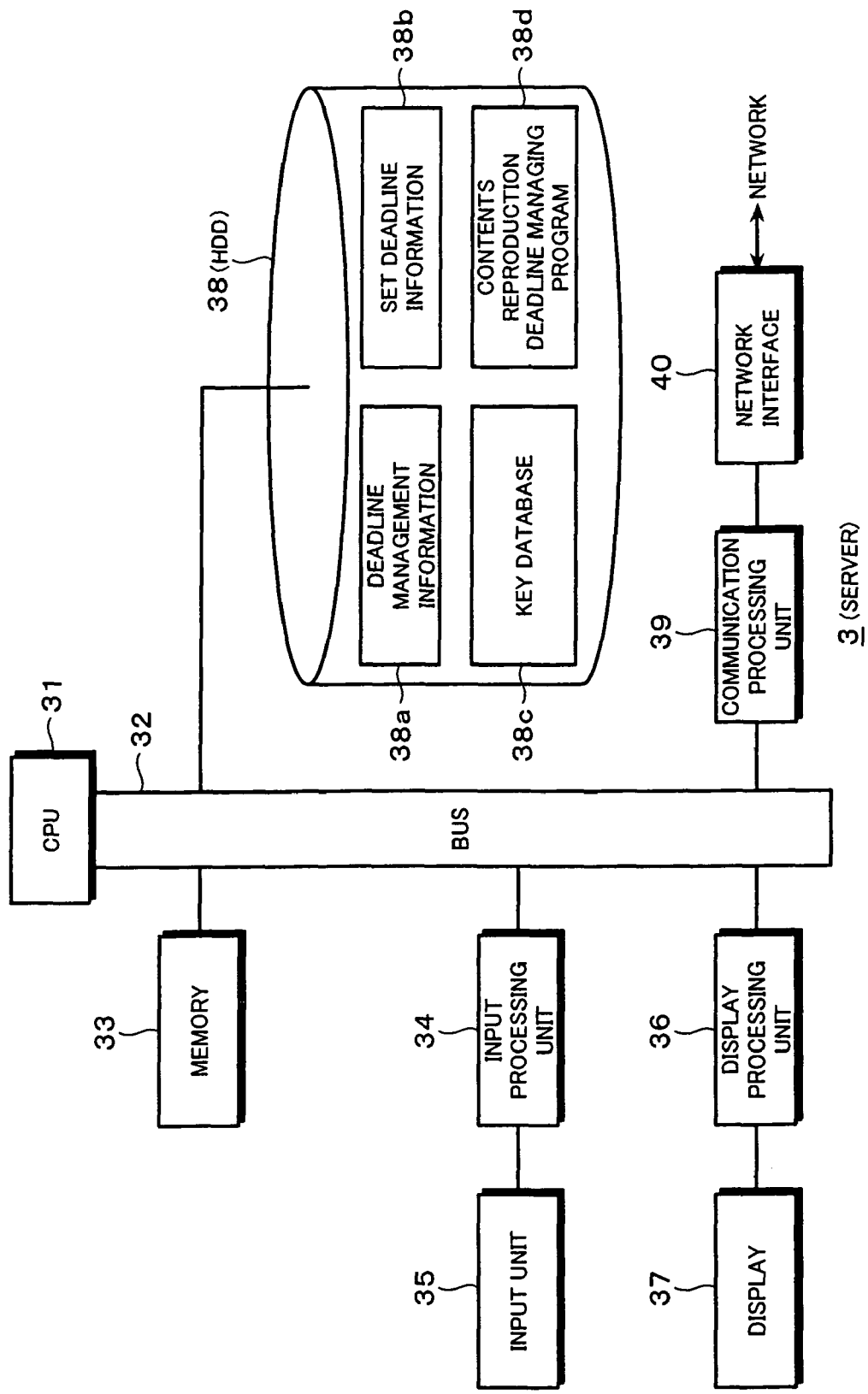
FIG. 4 is a block diagram showing an example of an internal construction of a server apparatus in the embodiment of the invention.

FIG. 4 shows an example of an internal construction of the server 3 shown in FIG. 1.

In the diagram, first, a CPU 31 controls the whole server 3 and executes an arithmetic operating process on the basis of an activated program. For example, it executes the operation according to an input to an input unit 35 (shown) storage of the data file onto an HDD 38, and creation, updating, and the like of the management information.

The CPU 31 transmits and receives a control signal and data to/from each circuit unit through a bus 32 (shown) A memory unit 33 integratedly shows a RAM, a ROM, a flash memory, and the like which are used for processes by the CPU 31.

An operating program, a program loader, and the like of the CPU 31 are stored in the ROM in the memory unit 33. Various arithmetic operation coefficients, parameters which are used in the program, and the like are stored in the flash memory. A data area and a task area which are used when the program is executed are temporarily assured in the RAM.

The storage of the data file and the creation, updating, and the like of the management information are executed on the HDD 38 under control of the CPU 31 as mentioned above.

In the case of the embodiment, various management information such as deadline management information 38a, set deadline information 38b, and a key database 38c are stored in the HDD 38 as shown in the diagram. Details of those information stored in the HDD 38 will be described hereinafter.

Figure 9:
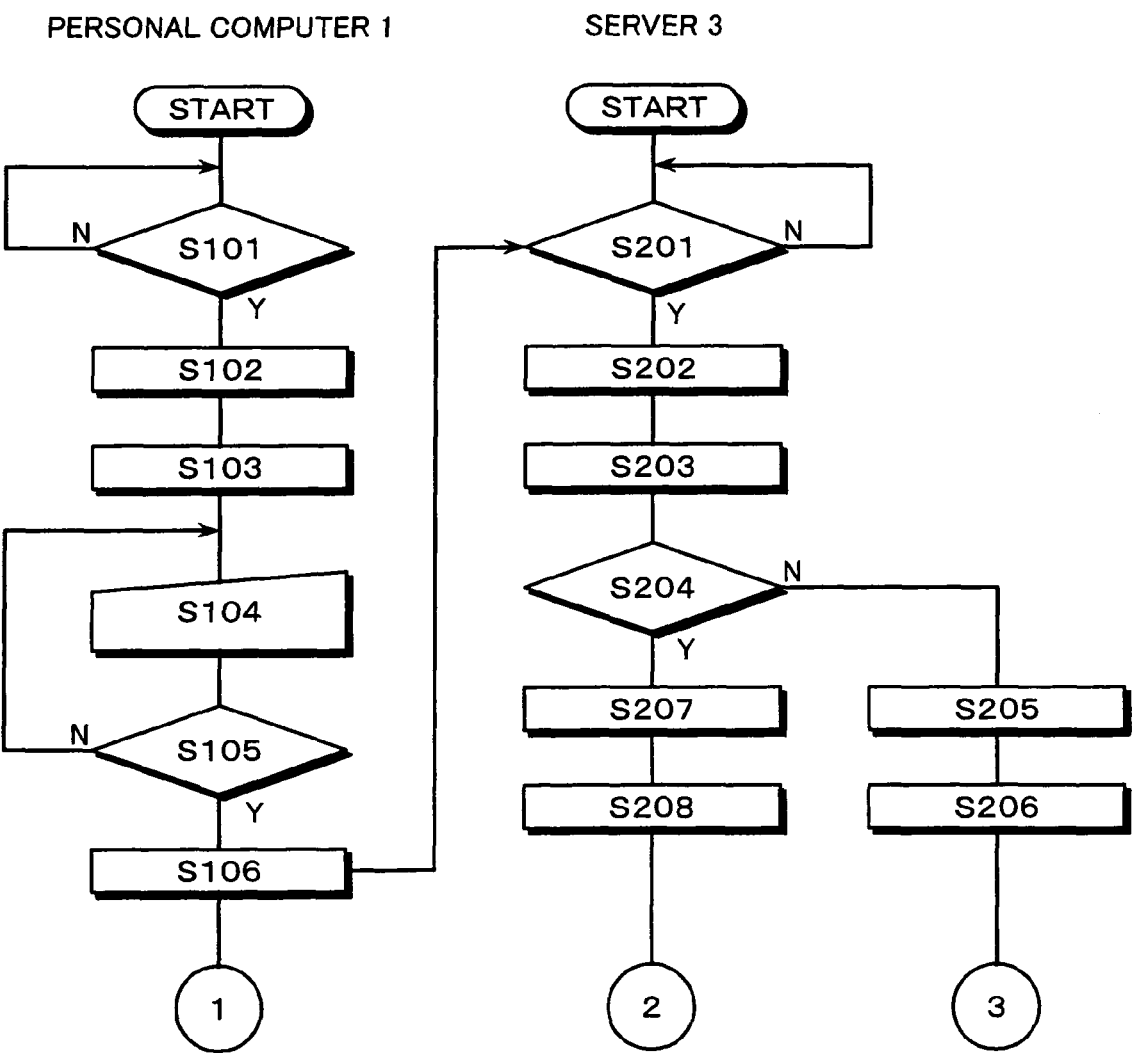
FIG. 9 is a flowchart showing the processing operation which is obtained in the contents reproduction deadline management system in the embodiment of the invention.
Figure 10:
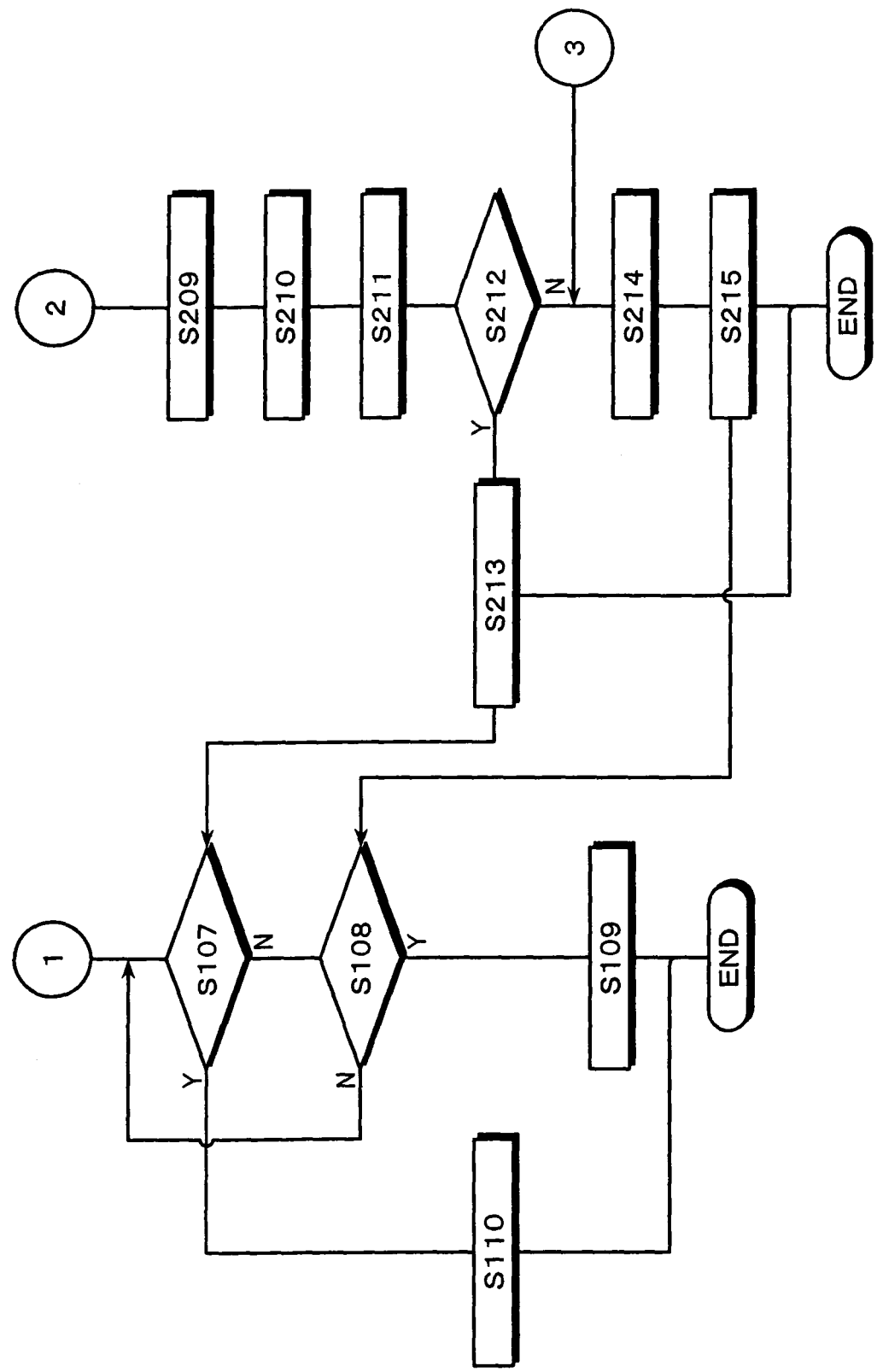
FIG. 10 is a flowchart showing the processing operation which is obtained in the contents reproduction deadline management system in the embodiment of the invention.

A contents reproduction deadline managing program 38a which is used for the CPU 31 to execute the processing operations shown in FIGS. 9 and 10 has also been stored in the HDD 38.

By executing the operation according to the contents reproduction deadline managing program 38a, the CPU 31 executes a process for managing the deadline to enable the reproduction with respect to, for example, the contents which is recorded in the reproduction-requested media 2 loaded in the personal computer 1.

The processing operation as an embodiment which is executed by such a CPU 31 will be explained hereinafter.

The input unit 35 is a keyboard and a mouse, a remote commander, or another input device (which are not shown) provided for the server 3. It is presumed that, in this case, the operator or the like on the side who manages services inputs various operations and data to the input unit 35.

A predetermined process is executed by an input processing unit 34 to information inputted by the input unit 35 and the processed information is sent to the CPU 31 as an input of the operation or data. The CPU 31 executes necessary arithmetic operations and control in correspondence to the inputted information.

A display 37 is a display device such as a liquid crystal panel or the like and displays various information to the operator or the like in this case.

For example, when the CPU 31 supplies display information to a display processing unit 36 in accordance with the various operating modes, the input state, and the communicating state, the display processing unit 36 allows the display 37 to execute the displaying operation on the basis of the supplied display data.

A communication processing unit 39 executes the encoding process of the transmission data and a decoding process of the reception data under the control of the CPU 31.

A network interface 40 transmits the transmission data encoded by the communication processing unit 39 to a predetermined apparatus, particularly, the personal computer 1 through the network 4 shown in FIG. 1. The signal transmitted from an external apparatus such as a personal computer 1 or the like through the network 4 is transmitted/received to/from the communication processing unit 39.

The communication processing unit 39 transfers the received information to the CPU 31.

5. Deadline Information

The contents reproduction deadline management system 0 of the embodiment constructed as mentioned above intends to manage the reproduction possible deadline regarding the contents recorded in the media 2.

For this purpose, first, it is necessary that the information of the reproduction possible deadline is previously set into the system in correspondence to each contents recorded in the media 2 as mentioned above.

FIG. 6 is a data structure diagram showing an example of a structure of the set deadline information 38b to decide the reproduction possible deadline for every contents as mentioned above.

The set deadline information 38b shown in FIG. 6 is stored in the HDD 38 in the server 3 on the side which manages the reproduction possible deadline regarding the contents recorded in the media 2 as also shown in FIG. 4 mentioned above.

First, in the set deadline information 38b, a range of the media ID shown in the diagram indicates a range of the media ID in which the contents of the same contents is recorded and which has been allocated to, for example, each of the media 2 of the same title.

That is, in this case, all of the media 2 to which the IDs in the range of, for example, "0001" to "1000" have been allocated are the media of the same title in which the same contents have been recorded. Similarly, the media 2 to which the IDs in the range of "1001" to "2500" (shown) have been allocated are the media 2 of the different titles in which the contents different from those of the media 2 to which the IDs of "0001" to "1000" have been allocated have been recorded.

Although it is sufficient that such allocation of the media IDs is arbitrarily executed upon manufacturing of the media 2, for example, if they are allocated by serial numbers every media 2 of the same title, the management is easy and it is, therefore, preferable.

To each of the ranges of such media IDs, the contents No. (number) indicative of each contents recorded in the media 2 of the same title corresponding to each range has been made to correspond.

For example, in the case where the media 2 is a CD, an MD, or the like, the track number corresponds to the contents No. That is, in the contents management information in the media 2, the contents No. indicates the information showing each contents recorded in the media 2.

In this case, therefore, the contents of the contents Nos. 1 to 3 have been recorded in the media 2 of the title corresponding to the range of the media IDs of IDs "0001" to "1000" (shown). Similarly, the contents of the contents Nos. 1 to 4 have been recorded in the media 2 of the title corresponding to the range of the media IDs of IDs "1001" to "2500".

In the set deadline information 38b, the deadline information is set in correspondence to each contents in the media 2 of each of those titles. That is, the information of, for example, the desired number of days as deadline information is stored in correspondence to each contents as shown in the diagram.

In the case of this diagram, for example, the deadline of "10" days is set for the contents of the contents No. 1 in the media 2 of the title corresponding to the range of IDs "0001" to "1000" as shown in the diagram. For example, the deadline of "20" days is set for the contents of the contents No. 2 in the media 2 of the title corresponding to the range of IDs "1001" to "2500".

6. Operation Outline of System

The following operation is executed in the contents reproduction deadline management system 0 of the embodiment on the basis of the contents of the set deadline information 38b as shown in FIG. 6.

Figure 5:
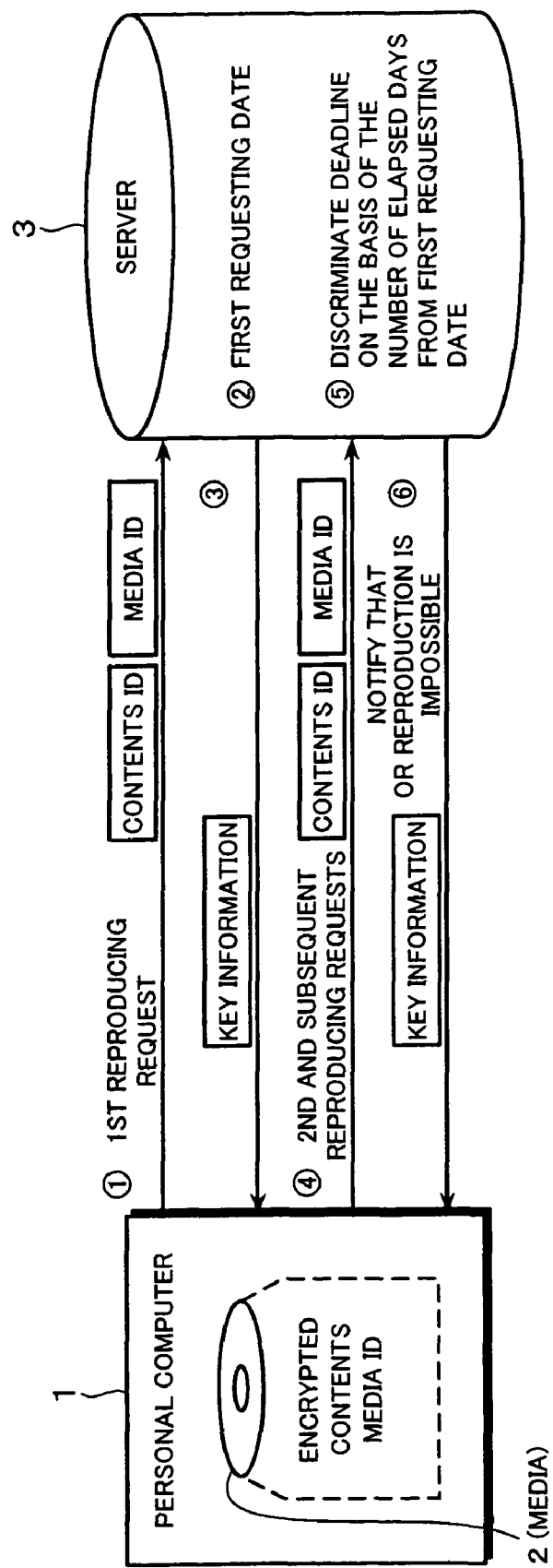
FIG. 5 is a diagram for explaining an outline of the operation which is obtained in the contents reproduction deadline management system in the embodiment of the invention.

FIG. 5 is a diagram for explaining the operation which is obtained in the contents reproduction deadline management system 0 of the embodiment. In FIG. 5, the operation which is obtained in the contents reproduction deadline management system 0 is schematically illustrated for simplicity of explanation. In the diagram, ① to ⑥ indicate the operating order in the system.

In the diagram, at least one or more contents which have been double-encrypted as also mentioned above and the media IDs allocated to the media 2 so as to be peculiar thereto have been recorded in the media 2 (shown).

In the case where such a media 2 is loaded into the personal computer 1, first, the personal computer 1 reads out the management information such as TOC information or the like from the inner rim area on, for example, the disc as a media 2 and also reads out the media IDs.

In this instance, the personal computer 1 recognizes the information necessary to reproduce the contents recorded in the media 2 such as information of the number of contents, title names, contents No., etc. of the contents recorded in the media 2 on the basis of, for example, the TOC information read out as mentioned above.

For example, at least the information of the contents Nos. and the information of the title names are displayed on the display 17 shown in FIG. 3 on the basis of those information. Further, the user is made to select and decide the contents to be reproduced on the basis of the information of the contents No., the information of the title names, and the like displayed as mentioned above.

When the contents to be reproduced is selected and decided by the user, the personal computer 1 transmits the information of the contents No. of the contents selected and decided as mentioned above and the information of the media IDs read out as mentioned above as a reproducing request to the server 3 (① in the diagram).

In this case, for example, it is assumed that the contents of the contents No. 1 and the contents of the contents No. 2 were selected and decided by the user. As shown by "first reproducing request" in the diagram, it is assumed that the reproducing request for those contents to the server 3 is the first reproducing request.

In the server 3, the first requesting date regarding those contents is set in response to the first reproducing request for such contents (② in the diagram).

That is, for the contents for which the first reproducing request has been made as mentioned above, for example, the information of the date (first requesting date) is stored as information showing the point of time when the first reproducing request has been made in correspondence to those contents.

Each time the first reproducing request regarding each contents is made, the first requesting date is stored in correspondence to each contents, so that the deadline management information 38a as shown in FIG. 7 is formed onto the HDD 38 shown in FIG. 4.

That is, as shown in FIG. 7, the first requesting date is stored in correspondence to the contents of each contents No. in the media 2 having each media ID.

By storing the first requesting date regarding each contents recorded in the media 2 every media ID as mentioned above, the first requesting date of each contents recorded in each media 2 is set to each media 2. Since the first requesting date of each contents is set to each media 2 as mentioned above, the deadline management can be made in accordance with the actual reproducing situation of each contents.

In FIG. 5, when the first requesting date of the contents for which the first reproducing request has been made as mentioned above is stored as deadline management information 38a in this manner, the server 3 transmits the corresponding key information to decrypt the encryption of those contents to the personal computer 1.

The contents which is recorded in the media 2 has been double-encrypted also as mentioned above. That is, also as shown in FIG. 2, the encryption of the first level to each contents which is recorded in the media 2 and the encryption of the second level to the whole contents have been made.

In the server 3 in this case, therefore, as key information to decrypt the encryption of the contents for which the reproducing request has been made as mentioned above, it is necessary that the key information of the first level corresponding to those contents and the key information of the second level corresponding to the whole contents are transmitted to the personal computer 1.

At this time, in the server 3, it is necessary to obtain a correspondence relation between each contents which is recorded in the media 2 and the key information so that the key information corresponding to the reproduction-requested contents can be recognized.

For this purpose, in the server 3, the key database 38c to recognize the key information corresponding to the contents in the media 2 for which the reproducing request has been made as mentioned above is stored onto the HDD 38 shown in FIG. 4.

The key database 38c has a structure as shown in, for example, FIG. 8.

As shown in FIG. 8, in the key database 38c, for example, the key information to decrypt the encryption of the second level (encryption of the whole contents) is stored in correspondence to the range of the media IDs serving as a delimiter of every title of the media 2.

As described in FIG. 2 mentioned above, in the embodiment, between the media 2 of the same title, the whole contents which is recorded has been encrypted by the same key. In this case, therefore, in the server 3, by searching for the key information corresponding to the range of the relevant media IDs with reference to the key database 38c on the basis of the received media ID, first, the key information to decrypt the encryption made to the whole contents in the media 2 can be obtained.

In the key database 38c, as shown in the diagram, the contents Nos. of the contents to be recorded are stored in correspondence to the range of the media IDs (title of the media 2). Further, the key information to decrypt the encryption of the first level is stored in correspondence to each contents No.

That is, after the corresponding title (range of the media IDs) is recognized by the media ID received as mentioned above, by recognizing the key information corresponding to the contents No. which coincides with the received information of the contents No., the key information of the first level corresponding to the reproduction-requested contents can be read out.

The key information in this case may be the information of the key itself to decrypt the encryption or the information serving as a source to form the key on the personal computer 1 side.

Although the key information corresponding to the reproduction-requested contents has been read out by using such a key database 38c here, it is not always necessary to use such a key database 38c in the present system.

For example, the contents which is recorded onto the media 2 is preliminarily encrypted by an encryption key formed by a predetermined arithmetic operation using the information such as media ID or contents No. On the server 3 side, when the reproduction is permitted, the corresponding key information for decryption is formed from an arithmetic operation result based on the received information of the media ID, the contents No., or the like and returned to the personal computer 1.

Thus, the present system is effectively accomplished even if the key database 38c is not used.

In FIG. 5, in the server 3, the corresponding key information is read out with reference to the key database 38c as mentioned above on the basis of the information of the media ID and that of the contents No. received by the personal computer 1.

The server 3 transmits the corresponding key information read out as mentioned above to the personal computer 1 (③ in the diagram).

Since the corresponding key information is transmitted from the server 3 as mentioned above, on the basis of the key information, the personal computer 1 which received it can decrypt the encryption of the second level to the whole contents of the loaded media 2 and the encryption of the first level to the contents of the contents No. selected by the user. Since both of the encryption of the first level and the encryption of the second level can be decrypted as mentioned above, in this case, the contents of the contents Nos. 1 and 2 selected and decided by the user so as to be reproduced as mentioned above can be reproduced.

It is now assumed that after the contents of the contents Nos. 1 and 2 had been reproduced on the basis of the first reproducing request as mentioned above, the contents of the contents Nos. 1 and 2 were selected and decided again and the reproducing request was made. That is, it is assumed that the second or subsequent reproducing request for the same contents was made as shown in ∇ in the diagram.

Also in this case, consequently, the personal computer 1 transmits the information of the contents No. of the contents selected and decided as mentioned above and the information of the media ID to the server 3.

In the server 3, in response to the second or subsequent reproducing request for the same contents as mentioned above, the reproduction possible deadline is discriminated on the basis of the number of days from the first requesting date of those contents (⑤ in the diagram).

At this time, in the server 3, first, the deadline management information 38a shown in FIG. 7 is referred to on the basis of the received information of the media ID and the contents No. That is, by referring to the deadline management information 38a on the basis of the received information of the media ID and the contents No. as mentioned above, the first requesting date of the reproduction-requested contents is read out.

When the first requesting date of the reproduction-requested contents is read out, the number of days from the first requesting date to the present day is calculated. That is, the number of days is calculated as information indicative of the elapsed time from the first requesting date to the present day with respect to such contents for which the second or subsequent reproducing request has been made.

When the number of elapsed days from the first requesting date regarding the reproduction-requested contents is calculated as mentioned above, the server 3 refers to the set deadline information 38b shown in FIG. 6 in order to discriminate whether or not the calculated number of days is larger than the number of days of the preset deadline. That is, on the basis of the information of the media ID and the contents No. received from the personal computer 1 as mentioned above, the information of the number of days as corresponding deadline information is read out from the set deadline information 38b shown in FIG. 6.

When the information of the number of days is read out as corresponding deadline information from the set deadline information 38b as mentioned above, this number of days is compared with the number of elapsed days from the first requesting date regarding the contents calculated as described above. Whether or not the number of elapsed days exceeds the number of days which has been set as deadline information is discriminated.

If it is determined as a result of the discrimination that the number of elapsed days exceeds the number of days which has been set as deadline information, it is regarded that the reproduction-requested contents has already expired the number of days which has been set, a reproduction impossible notification to notify that the reproduction of such contents is not permitted is transmitted to the personal computer 1 (⑥ in the diagram).

That is, in this case, since the key information to decrypt the encryption of the contents is not transmitted, the reproduction of the contents is disabled. Consequently, in correspondence to the case where the contents whose reproduction has been requested in the personal computer 1 has expired the preset deadline, the reproduction of the contents can be disabled.

Although the reproduction impossible notification is transmitted in the case where the reproduction-requested contents has expired the deadline, it is also possible to construct the system in such a manner that such a reproduction impossible notification is not transmitted but, only when the key information is not transmitted, the reproduction regarding such contents is disabled.

If it is decided that the number of elapsed days does not exceed the number of days set as deadline information, it is regarded that the reproduction-requested contents does not expire the set deadline yet, the corresponding key information is transmitted to the personal computer 1 so as to enable the reproduction of such contents (⑥ in the diagram).

In this instance, the server 3 refers to the key database 38c shown in FIG. 8 on the basis of the received information of the media ID and the contents No. in order to read out the key information corresponding to the contents for which the reproduction has been requested. First, on the basis of the media ID, the range of the corresponding media ID which is stored in the key data base 38c is recognized. Further, by reading out the key information which is stored in correspondence to the range of the media ID, the key information of the second level to decrypt the encryption of the whole contents in the reproduction-requested media 2 is read out.

After that, among the contents Nos. made to correspond to the range of the media ID recognized as mentioned above, the key information corresponding to the contents No. which coincides with the received contents No. is read out. That is, the key information to decrypt the encryption of the first level corresponding to the reproduction-requested contents is read out.

When the key information to decrypt the reproduction-requested contents is read out as mentioned above, the server 3 transmits those key information to the personal computer 1.

In the personal computer 1, thus, on the basis of those key information, both of the encryption of the first level and the encryption of the second level performed to the contents which is recorded to the reproduction-requested media 2 can be decrypted and those contents can be reproduced.

In other words, the reproduction of those contents can be permitted in correspondence to the case where it is determined that the reproduction-requested contents does not expire the preset deadline on the server 3 side.

As will be also understood from the operation upon loading of the media 2 described in FIG. 5, the case where the management information of the media 2 can be read on the personal computer 1 side at a point of time when the media 2 is loaded has been described as an example. That is, the case where the management information area in the media 2 is not encrypted so that the personal computer 1 can read the management information of the media 2 at the point of time when the media 2 is loaded is presumed.

The embodiment, however, can also cope with the case where the management information area in the media 2 is encrypted. That is, in this case, on the personal computer 1 side, for example, only the media ID read out of the media 2 is first transmitted to the server 3. On the server 3 side, on the basis of the media ID, the corresponding management information is transmitted to the personal computer 1 side.

After that, it is sufficient that on the basis of the management information transmitted as mentioned above, a contents list is displayed on the personal computer 1 side, thereby making the user select and decide the reproduction contents.

Or, it is also possible to construct in such a manner that in the case where the management information area in the media 2 is encrypted as mentioned above, the server 3 returns the key information corresponding to the media ID transmitted from the personal computer 1, the management information area is decrypted on the personal computer 1 side, and the contents list corresponding to the loaded media 2 is displayed, thereby making the user select the reproduction contents.

7. Processing Operation

To realize the operation as mentioned above, in the contents reproduction deadline management system 0 of the embodiment, the following processing operation as shown in FIGS. 9 and 10 is executed.

In FIGS. 9 and 10, the processing operation of the personal computer 1 is executed by the CPU 11 on the basis of the contents reproduction deadline managing program stored on the HDD 20 shown in FIG. 3 and the processing operation of the server 3 is executed by the CPU 31 on the basis of the contents reproduction deadline managing program 38d stored on the HDD 38 shown in FIG. 4.

First, in step S101 shown in FIG. 9, on the personal computer 1 side, whether or not the media 2 has been loaded is monitored. When the media 2 is loaded into the media drive 19 shown in FIG. 3, the processing routine advances to step S102.

In step S102, the media ID and the TOC information as management information recorded in the inner rim area on, for example, the disc as a loaded media 2 are read.

That is, by controlling the drive control unit 18, the media ID and the TOC information as management information which are recorded in the media 2 loaded into the media drive 19 are read.

In next step S103, the contents list formed on the basis of the contents of the TOC information read as mentioned above is displayed on the display 17 shown in FIG. 3.

As a contents list displayed in step S103 as mentioned above, it is sufficient that, for example, information such as contents No., title name, and the like of each contents which is recorded in the media 2 is displayed.

In step S104, the user is made to select the contents to be reproduced. As a processing operation in step S104, in accordance with the operation executed by the user to the input unit 15 shown in FIG. 3, a process for changing the display contents of the contents list displayed on the display 17 as mentioned above, or the like is executed, thereby allowing the user to select the contents to be reproduced.

In subsequent step S105, whether or not the operation to decide the contents selected in step S104 has been executed is discriminated. If the predetermined operation to the input unit 15 is not executed yet and the operation to decide the selected contents is not executed, the process of step S104 is executed again and the user is subsequently made to select the reproduction contents. When the deciding operation is executed by the user, the processing routine advances to step S106.

In step S106, the information of the contents No. of the contents selected in the process of step S104 and the information of the media ID read by the process of step S102 mentioned above are transmitted as a reproducing request to the server 3.

On the server 3 side, whether or not the information of the media ID and the information of the contents No. which were transmitted as mentioned above as a reproducing request have been received is monitored by a process in step S201 shown in the diagram.

If the information of the media ID and the contents No. transmitted from the personal computer 1 is received, those information is temporarily held, for example, in the RAM in the memory unit 33 shown in FIG. 4 in step S202 in subsequent step S203, the deadline management information 38a in the HDD 38 shown in FIG. 4 is referred to on the basis of the held information of the media ID and the contents No.

In step S204, whether or not the same information as the received information of the media ID and the contents No. has been stored in the deadline management information 38a as a result of the reference to the deadline management information 38a as mentioned above is discriminated.

As already described above, with respect to the contents whose reproduction has already been requested, the information of the contents No. and the media ID of the media 2 in which the contents is recorded have been stored in the deadline management information 38a. Therefore, by discriminating whether or not the information of the media ID and the contents No. received from the personal computer 1 side has already been stored in the deadline management information 38a as mentioned above, whether or not the reproduction of the reproduction-requested contents has already been requested in the past can be discriminated.

That is, whether or not the reproducing request for the contents selected at present by the user in step S104 is the second or subsequent reproducing request can be discriminated.

If it is decided that the reproducing request is the second or subsequent reproducing request by determining that the same information as the information of the media ID and the contents No. received as mentioned above has already been stored in the deadline management information 38a in step S204, the processing routine advances to step S207.

If a negative result is obtained by determining that the same information as the received information of the media ID and the contents No. is not stored yet in the deadline management information 38a, the processing routine advances to step S205.

As will be understood from the description so far, in the embodiment, if one or more contents have been recorded in the media 2, the user can select and decide a desired one or more contents from those contents and make the reproducing request. That is, this causes a case where the information of a plurality of contents Nos. is received from the personal computer 1 side in the foregoing process of step S201.

In association with it, in the discriminating process of step S204 mentioned above, it is necessary to discriminate whether or not the information of a plurality of contents Nos. has already been stored in the deadline management information 38a. In other words, it is necessary to execute such a discriminating process in parallel every contents No.

Consequently, although processes from subsequent step S207 to step S215 shown in FIG. 10 including the process of step S204 are not shown here as well, it is assumed that when a plurality of contents Nos. are received as mentioned above, processes are executed in parallel with respect to those contents Nos.

In step S205 when the negative result is obtained in step S204 mentioned above, the information of the media ID and/or the information of the contents No. which were temporarily held in the foregoing process of step S202 is stored in the deadline management information 38a.

As a case where the negative result is obtained in the process of step S204 mentioned above, there is a case where both of the media ID and the contents No. are not stored and a case where although the media ID has already been stored, only the contents No. is not stored yet.

That is, the case where the reproducing request is made at present for the first time with respect to the media 2 corresponds to the former case. The case where, among the contents which are recorded in the media 2, there are the contents whose reproduction has already been requested and the reproduction of the contents which was selected and decided at present has been requested for the first time corresponds to the latter case.

To cope with those cases, in step S205, actually, if both of the media ID and the contents No. are not stored, the media ID and the contents No. are written into the deadline management information 38a in correspondence to each other. If only the information of the contents No. is not stored, the information of the contents No. is written into the deadline management information 38a in correspondence to the media ID received as a reproducing request at present.

In subsequent step S206, the present date is written in correspondence to the information of the media ID and/or the information of the contents No. which were written as mentioned above. That is, the first requesting date regarding the contents whose reproduction has been requested at present for the first time is stored into the deadline management information 38a.

When the present date is written by the process of step S206 in correspondence to the information of the media ID and/or the information of the contents No. which were written in step S205, the processing routine advances to step S214 shown in FIG. 10.

In step S214 shown in FIG. 10, the key information corresponding to the information of the media ID and the contents No. held by the process of step S202 mentioned above is read out with reference to the key database 38c.

That is, in this case, since the contents written in the deadline management information 38a is the contents whose reproduction has been requested for the first time, the situation where the deadline has passed never occurs. Therefore, the key information corresponding to such contents is read out.

In this instance, as described above, first, the key information of the second level is read out with reference to the key information corresponding to the range of the relevant media ID in the key database 38c. At the same time, the key information of the first level is also read out with reference to the key information which is stored in correspondence to the contents No. that coincides with the information of the contents No. held by the process of step S202 among the contents Nos. corresponding to the range of the media ID which was referred to as mentioned above.

When the corresponding key information of the first level and that of the second level are read out from the key database 38c as mentioned above, those key information is transmitted to the personal computer 1 in step S215.

On the personal computer 1 side, the presence or absence of the reception of those key information is discriminated in step S108 shown in FIG. 10.

If it is determined that the key information from the server 3 is not received yet, the processing routine advances to step S107 as shown in the diagram and the presence or absence of the reception of a reproduction impossible notification from the server 3 is discriminated. If it is determined that the key information has been received, the processing routine advances to step S109.

In step S109, the corresponding contents is decrypted on the basis of the received key information and reproduced.

That is, as a process of steps 109, first, a process to decrypt the encryption of the second level performed to the whole contents of the loaded media 2 on the basis of the received key information is executed. Similarly, a process to decrypt the encryption of the first level performed to the contents selected in step S104 on the basis of the key information of the first level received from the server 3 is executed.

By executing the process of step S109 as mentioned above, the contents selected in step S104 can be decrypted, so that the contents selected and decided by the user so as to be reproduced can be reproduced.

Thus, it is regarded that the reproducing request has been made for the first time. With respect to the contents in which the negative result was obtained by the process of step S204 on the server 3 side shown in FIG. 9, the corresponding key information is transmitted to the personal computer 1 side as mentioned above, thereby enabling the reproduction of the contents to be permitted.

Subsequently, explanation will be made with respect to the case where the affirmative result is obtained by deciding that the information which coincides with the information of the media ID and the contents No. received from the personal computer 1 has been stored in the deadline management information 38a in step S204 shown in FIG. 9.

If the affirmative result is obtained in the process of step S204 as mentioned above, the contents of the contents No. discriminated in step S204 is the contents whose reproduction has already been requested in the past.

Consequently, first, in subsequent step S207, in order to calculate the number of elapsed days from the first requesting date with respect to the contents whose reproduction has already been requested, the first requesting date which has been stored in the deadline management information 38a and corresponds to such contents is read out.

That is, the information of the first requesting date stored in correspondence to the contents No. which was determined to be coincident by the process of step S204 is read out from the deadline management information 38a.

In subsequent step S208, a period of time from the first requesting date read out in this manner to the present date is calculated and the number of elapsed days from the first requesting date with respect to the contents of the contents No. is calculated.

After the process of step S208 is executed, the processing routine advances to step S209 shown in FIG. 10.

In step S209 shown in FIG. 10, the set deadline information 38b shown in FIG. 6 is referred to on the basis of the information of the media ID and the contents No. held by the process of step S202. That is, the deadline information set for the contents corresponding to the information of the media ID and the contents No. held as mentioned above is referred to.

In next step S210, the deadline information referred to as mentioned above is recognized. Further, in the process of step S211, the information of the number of days shown by the deadline information recognized in this manner is compared with the number of elapsed days from the first requesting date calculated by the process of step S208.

In step S212, whether or not the reproduction possible deadline of the reproduction-requested contents has passed is discriminated on the basis of a comparison result according to the process of step S211.

That is, in this case, if it is determined from the comparison result according to the process of step S211 that the number of elapsed days from the first requesting date calculated by the process of step S208 is larger than the number of days shown by the deadline information, it is regarded that the reproduction possible deadline of the relevant contents has passed, and the affirmative result is obtained.

If the number of elapsed days from the first requesting date calculated by the process of step S208 is smaller than the number of days shown by the deadline information, it is regarded that the reproduction possible deadline of the reproduction-requested contents is not come yet, and the negative result is obtained.

If the negative result is obtained by regarding that the reproduction possible deadline of the relevant contents is not come yet in step S212, the processing routine advances to step S214.

In step S214, as already described, the key information of the first level and that of the second level corresponding to the information of the media ID and the contents No. held by the process of step S202 are read out with reference to the key database 38c. In subsequent step S215, those key information is transmitted to the personal computer 1.

Thus, as already described, on the personal computer 1 side, first, the reception of those key information is discriminated by the process of step S108. Further, in step S109, the corresponding contents is decrypted on the basis of those key information and reproduced.

Thus, if it is determined in step S104 that the reproduction possible deadline of the contents selected and decided by the user so as to be reproduced is not come yet, the reproduction of the contents can be permitted.

If the affirmative result is obtained by deciding that the reproduction possible deadline of the relevant contents has passed in step S212, the reproduction impossible notification regarding such contents is transmitted to the personal computer 1 by the process of step S213 (shown).

On the personal computer 1 side, the presence or absence of the reception of the reproduction impossible notification from the server 3 side is discriminated in step S107 shown in the diagram. If the reproduction impossible notification is received, the processing routine advances to step S110 and the process corresponding to the reproduction impossible notification is executed.

As a process of step S110, a necessary corresponding process in which, for example, a message to notify the user that the reproduction possible deadline of the selected contents has passed is displayed on the display 17 or the like is executed. That is, by executing such a corresponding process, the corresponding contents is not reproduced.

Consequently, the reproduction of the contents whose reproduction possible deadline has passed as mentioned above can be disabled.

As will be also understood from the processing operation of steps S103 to S106 mentioned above, the reproducing request information is transmitted to the server 3 in correspondence to the operation executed by the user. However, in place of such a method, for example, it is also possible to construct in such a manner that the reproducing request information is automatically transmitted to the server 3 when the media 2 is loaded and the media ID is read.

That is, in the embodiment, when the operation to request the reading of the contents is executed, at least the media ID (identification information) as reproducing request information is transmitted to the server 3. However, in place of such a method, when the media 2 is loaded, the identification information as reproducing request information can be also transmitted.

In this case, as reproducing request information which is automatically transmitted from the personal computer 1 side as mentioned above, all of the contents recorded in the media 2 can be designated or only the contents of the predetermined contents No. can be also designated.

As described above, according to the contents reproduction deadline management system 0 of the embodiment, the reproduction possible deadline of the contents recorded in each media 2 can be managed on the basis of the media ID allocated to each media 2 so as to be peculiar thereto.

Thus, according to the contents reproduction deadline management system 0 of the embodiment, when the reproduction possible deadline of the contents recorded in the media 2 is managed, the operation to set the registration information such as personal information or the like of the user between the personal computer 1 and the server 3 as in the conventional method is unnecessary.

Thus, such a fear that the personal information leaks to the outside as in the conventional method is eliminated and the safe and practical contents reproduction deadline management system can be provided.

When the reproduction possible deadline of the contents is managed, the operation to set the registration information such as personal information or the like of the user between the personal computer 1 and the server 3 as in the conventional method is unnecessary as mentioned above. Therefore, for example, the user can easily receive the services according to the system of the embodiment from the different personal computer 1.

That is, in the contents reproduction deadline management system 0 of the embodiment, the user can also easily receive the services of the embodiment from any terminal apparatus without selecting the personal computer 1 to be used.

In the contents reproduction deadline management system 0 of the embodiment, the reproduction deadline of each contents is managed on the basis of the media ID recorded in the media 2 as mentioned above.

In the contents reproduction deadline management system 0 of the embodiment, consequently, such a situation that the reproduction possible deadline corresponding to the contents which is recorded in the media 2 is changed in dependence on the personal computer 1 to be used is eliminated.

Thus, such a situation that the reproduction possible deadline of the contents is changed when the reproducing request is made again to the server 3 by another personal computer 1 with respect to the same contents as in the conventional method can be prevented according to the embodiment.

Since such a situation that the reproduction possible deadline of the contents is changed as mentioned above can be prevented, the contents reproduction deadline management which is equal to all of the users can be made.

Since the deadline management of the contents can be made in a lump on the server 3 side as mentioned above, such a situation that the clock of the personal computer 1 side is changed and the reproduction possible deadline is illegally extended as in the conventional system can be effectively prevented.

As mentioned above, in the contents reproduction deadline management system 0 of the embodiment, the reproduction possible deadline of each contents which is recorded in the media 2 is set to the predetermined period of time after the first reproducing request was made.

That is, by using such a method, for example, such a situation that the reproduction possible deadline has passed without reproducing the contents at all and the reproduction is disabled can be effectively prevented. Thus, the equal reproduction possible deadline according to the actual reproducing situation of each contents can be set.

The operation of the personal computer 1 of the embodiment as described above is realized by the contents reproduction deadline managing program stored on the HDD 20 shown in FIG. 3. Similarly, the operation of the server 3 is realized by the contents reproduction deadline managing program 38*d* stored on the HDD 38 shown in FIG. 4.

If such programs are recorded in a recording medium and, for example, the recording medium is constructed as a package media, the programs to realize the operations of the server 3 and the personal computer 1 in the embodiment can be easily provided. It is suitable to design the apparatus and construct the system.

The recording medium to record the programs can be also realized by an optical disc of the CD system, DVD system, or MD system, a magnetooptic disk, a magnetic disk such as a flexible disk, a memory card using a solid-state memory, or the like.

Although the example in which the media ID to be allocated to each media 2 is formed on the protective film on the disc has been mentioned in the foregoing embodiment, as another method, for example, the media ID can be also unrewritably recorded into the TOC area or another area.

Although the example in which the contents which is recorded in the media 2 is the AV data of the video image, audio sound, or the like has been mentioned in the foregoing embodiment, in place of such a method, another data such as text data, image data, or the like can be also used.

Although the deadline information which is set in correspondence to each contents has been set as information of the number of days in the foregoing embodiment, in place of such information, it can be also set as detailed time information such as hour/minute/second. Coarse time information such as year/month can be also set.

Although the case where the reproduction possible deadline of each contents which is recorded in each media 2 is set as the number of elapsed days from the date when the first reproducing request is made has been mentioned as an example in the foregoing embodiment, in place of such information, date information of the reproduction possible deadline such as "until o month×day" can be also set.

In this case, for example, if the reproduction possible deadline of each contents is uniformly set for every title, the reproduction deadline of the contents can be managed on the basis of only the information of the media ID recorded in each media 2.

That is, in this case, if the media ID of the media 2 in which the reproduction-requested contents is recorded is known, the corresponding title partitioned by the range of the media ID can be recognized.

In this case, since the reproduction possible deadline of each contents is uniformly set for every title as mentioned above, the title of the reproduction-requested media 2 can be recognized as mentioned above, so that the deadline information of each contents which is recorded there can be also recognized.

Thus, the reproduction possible deadline of the contents can be managed on the basis of only the information of the media ID recorded in the media 2 as mentioned above.

Explaining for confirmation, even in the embodiment in which the deadline is individually managed with respect to one or more contents which are recorded in the media 2 as described above, as information which is newly allocated to the media 2, it is sufficient to use only the media ID that is peculiar to each media.

That is, according to the contents No. itself which is managed on the basis of the TOC information or the like of the media, the contents can be merely specified in the album title as a media and it is not information which can directly specify the contents.

However, by combining the media ID and the contents No. of the embodiment, first, the title of the media is specified by the media ID and, further, under the layer of the title, the contents can be specified by the contents No.

Thus, each contents can be identified without newly allocating identification information peculiar to each contents to the media 2.

That is, also in the foregoing embodiment, merely by allocating such a media ID to the media 2, each contents which is recorded in each media 2 can be identified.

As a contents reproduction deadline management system 0 of the embodiment, for example, the following modifications are possible.

First, the following first modification can be constructed.

That is, on the server apparatus side of the embodiment, since the reproduction possible deadline can be easily changed merely by changing the contents of the set deadline information 38*b* shown in FIG. 6, the reproduction possible deadline is changed by using it in accordance with, for example, a predetermined condition.

As a second modification, the contents reproduction deadline management system 0 of the embodiment is applied to rental services of the contents.

In this case, the contents serving as a target of the rental is recorded into the media 2. After the user loads the media 2 into the personal computer 1, he selects and decides the contents which he wants to rent from the contents recorded in the media 2 and makes the reproducing request.

Consequently, the first requesting date of the contents is set on the server 3 side. After that, within the reproduction possible deadline set as mentioned above, the corresponding key information is returned to the personal computer 1 each time the reproducing request is made, and the contents can be reproduced. That is, in this case, since "first requesting date=rental start date" and within the rental period after the rental start date, the contents can be reproduced.

As a third modification, in addition to the management regarding the reproduction possible deadline in the system of the embodiment, an arbitrary period-limited service is executed with respect to each contents recorded in the media 2.

For example, as such a third modification, there is a method whereby, when the reproducing request regarding certain contents is made for a predetermined period of time, the reproduction possible deadline of such contents is extended or the like.

Or, there is another method whereby premium contents such as what is called a bonus track is previously recorded in the media 2 and, for example, only when the reproducing request is made for a certain period of time, the key information corresponding to the contents is transmitted from the server 3 to the personal computer 1, thereby enabling such premium contents to be reproduced.

According to such a third modification, entertainment performance regarding the contents reproduction can be enhanced.

As mentioned above, according to the invention, the peculiar identification information to identify the recording medium itself is recorded on to the recording medium on which the contents information as a target of the reproduction deadline management is recorded.

At least the identification information recorded on the recording medium as mentioned above is read out by the terminal apparatus and transmitted to the server apparatus. Further, the server apparatus discriminates whether or not the reproduction possible deadline of the contents information recorded on the recording medium has passed on the basis of the reproduction possible deadline information showing the reproduction possible deadline of the contents information recorded on the recording medium on the basis of at least the identification information.

After that, on the server apparatus side, if it is determined that the reproduction possible deadline is not come yet, control is made so as to transmit the reproducing operation control information to execute the reproduction of the contents, and if it is determined that the reproduction possible deadline has passed, control is made so as not to execute the reproduction of the contents information.

That is, according to such an invention as mentioned above, the reproduction possible deadline regarding the contents information recorded on the recording medium can be managed on the server apparatus side on the basis of at least the identification information recorded on the recording medium.

In other words, thus, according to the invention, when the reproduction possible deadline of the contents information recorded on the recording medium is managed, the operation for allowing the server apparatus side to set the registration information such as personal information or the like of the user as in the conventional system is unnecessary.

Since the reproduction deadline management of the contents information can be made without allowing the server apparatus to set the registration information such as personal information or the like of the user as mentioned above, a fear that the personal information of the user leaks to the outside of the system is eliminated. The safe and practical contents reproduction deadline management system can be provided.

When the reproduction possible deadline is managed as mentioned above, there is no need to set the registration information such as personal information or the like of the user. Therefore, for example, when the user intends to obtain the services according to the invention by another terminal apparatus, troublesomeness to register the personal information or the like of the user again between the terminal apparatus and the server apparatus is omitted. He can easily obtain the services by exchanging the terminal apparatus which is used.

That is, consequently, the user can easily obtain the services from any terminal apparatus.

In the invention, since the reproduction deadline management of each contents information is made on the basis of the identification information recorded on the recording medium as mentioned above, for example, such a situation that the reproduction possible deadline of the contents information is changed in dependence on the terminal apparatus which is used is eliminated.

Thus, for example, such a situation that when the reproducing request is made again by another terminal apparatus with respect to the same contents information, the reproduction possible deadline of the contents information is changed in the conventional system can be prevented according to the invention.

Since such a situation that the reproduction possible deadline of the contents information is changed as mentioned above can be prevented, the reproduction deadline management of the contents information which is equal to all of the users can be made.

In the invention, since the management regarding the reproduction possible deadline of the contents information is made in a lump on the server apparatus side, such a situation that the clock of the terminal apparatus side is changed and the reproduction possible deadline is illegally extended as in the conventional system can be effectively prevented.

The invention claimed is:

1. A contents reproduction deadline management system comprising a terminal apparatus and a server apparatus, wherein
said terminal apparatus includes
a terminal apparatus network interface configured to communicate with said server apparatus through a network,
a reading unit configured to read information from a recording medium on which one or more contents information and unique identification information to identify the recording medium have been recorded, wherein the contents information recorded on the recording medium is encrypted, and
a reproduction control unit configured to cause said terminal network apparatus interface to transmit at least said identification information read by said reading unit to said server apparatus each time the reading unit reads the content information and unique identification information from the recording medium, and control a reproducing operation of the contents information recorded on said recording medium on the basis of reproducing operation control information received from said server apparatus and corresponding to said transmitted identification information, and
said server apparatus includes
a server apparatus network interface configured to communicate with said terminal apparatus through said network,
a memory configured to store reproduction expiration information showing a reproduction expiration of said contents information recorded on said recording medium on the basis of at least said identification information is stored, wherein the reproduction expiration stored in the memory is based on the time of first receipt of the identification information from the terminal apparatus, a processor configured to discriminate whether the reproduction expiration of the contents information recorded on said recording medium has passed on the basis of said identification information which is received by said server apparatus network interface and said reproduction expiration information stored in said memory, and a communication controller configured to control said server apparatus network interface in such a manner that if it is determined by a discrimination result of said processor that said reproduction expiration is not come yet, reproducing operation control information to enable reproduction of said contents information is transmitted by said server apparatus network interface, wherein the control information enabling reproduction includes key information to decrypt the encrypted content and, if it is determined that said reproduction expiration has passed, the reproducing operation control information to inhibit reproduction of said contents information on said terminal apparatus side is transmitted and the transmission of said key information to said terminal apparatus is inhibited.

2. A contents reproduction deadline management system according to claim 1, wherein said reproduction control unit is configured to control said terminal apparatus interface to transmit said identification information to said server apparatus when said recording medium is loaded into said terminal apparatus.

3. A contents reproduction deadline management system according to claim 1, wherein said reproduction control unit is configured to control said terminal apparatus interface to transmit said identification information read by said reading unit and contents specifying information specifying said contents information to said server apparatus, and said processor at said server is configured to discriminate whether the reproduction expiration of the contents information recorded on said recording medium has passed on the basis of said reproduction expiration information which has been stored in said memory at said server and corresponds to the identification information transmitted from said terminal apparatus and said contents specifying information.

4. A contents reproduction deadline management system according to claim 1, wherein in said recording medium, the encryption based on a predetermined encryption key has been performed to the whole area where the contents information has been recorded, and said communication controller at said server is configured to control said server apparatus network interface in such a manner that if it is determined by the discrimination result of said processor at said server that said reproduction expiration is not come yet, key information to decrypt the encryption performed to the whole area where said contents information has been recorded is transmitted and, if it is determined that said reproduction expiration has passed, the transmission of said key information to said terminal apparatus is inhibited.

5. A contents reproduction deadline management system according to claim 1, wherein, to the contents information recorded on said recording medium, a predetermined encrypting process has been executed for every said contents information, and said communication controller at said server is configured to control said server apparatus network interface in such a manner that if it is determined by the discrimination result of said processor at said server that said reproduction expiration is not come yet, key information to decrypt the encrypting process performed every said contents information is transmitted by said server side communicating means and, if it is determined that said reproduction expiration has passed, the transmission of said key information to said terminal apparatus is inhibited.

6. A contents reproduction deadline management system according to claim 1, wherein said communication controller at said server is configured to control said server apparatus network interface in such a manner that if it is determined by the discrimination result of said processor at said server that said reproduction expiration has passed, the reproducing operation control information to inhibit the reproduction of said contents information on said terminal apparatus side is transmitted to said terminal apparatus.

7. A contents reproduction deadline management system according to claim 1, wherein said identification information has been recorded in an unrewritable state onto said recording medium.

8. A contents reproduction deadline managing method of allowing a terminal apparatus and a server apparatus to execute:

reading information from a recording medium on which one or more contents information and unique identification information to identify the recording medium have been recorded, wherein the contents information recorded on the recording medium is encrypted;

transmitting at least said identification information read by said reading to the server apparatus each time the contents information and unique identification information are read from the recording medium;

discriminating in said server apparatus whether a reproduction expiration of the contents information recorded on said recording medium has passed on the basis of reproduction expiration information indicative of a reproduction expiration of said contents information which is recorded on said recording medium and said identification information which is received from said terminal information, wherein the reproduction expiration is based on the time of first receipt of the identification information from the terminal apparatus, executing control in such a manner that if it is determined by a discrimination result of said discriminating that said reproduction expiration is not come yet, the reproducing operation control information to enable reproduction of said contents information is transmitted from said server apparatus to said terminal apparatus, wherein the control information enabling reproduction includes key information to decrypt the encrypted content and, if it is determined that the reproduction expiration has passed, the reproducing operation control information to inhibit reproduction of said contents information on said terminal apparatus side is transmitted from said server apparatus to said terminal apparatus and the transmission of said key information to said terminal apparatus is inhibited; and controlling the reproducing operation of the contents information recorded on said recording medium on the basis of the reproducing operation control information which is received from said server apparatus.

9. A terminal apparatus in a contents reproduction deadline management system constructed by the terminal apparatus and a server apparatus for managing reproduction of contents recorded on a recording medium on the basis of unique identification information to identify the recording medium and reproduction expiration information indicative of a reproduction expiration, comprising:
- a network interface configured to communicate with said server apparatus through a network;
- a reading unit configured to read information from the recording medium on which one or more contents information and the unique identification information to identify the recording medium have been recorded, wherein the contents information recorded on the recording medium is encrypted;
- the network interface configured to transmit said identification information read by said reading to said server apparatus each time the reading unit reads the content information and unique identification information from the recording medium, and receive reproducing operation control information to control the reproducing operation of the contents recorded on the recording medium identified by said identification information on the basis of the transmitted identification information; and
- a reproduction control unit configured to execute reproduction of the contents when the reproducing operation control information received by said network interface is the reproducing operation control information to permit reproduction of the contents, and inhibit reproduction of the contents when the reproducing operation control information is reproducing operation control information to inhibit reproduction of the contents, wherein the reproduction expiration stored in a memory at the server apparatus is based on the time of first receipt of the identification information at the server apparatus from the terminal apparatus.

10. A non-transitory computer-readable medium including a program, which when executed by a terminal apparatus in a contents reproduction deadline management system constructed by the terminal apparatus and a server apparatus, causes the terminal to perform a method comprising:
- reading information from a recording medium on which one or more contents information and unique identification information to identify the recording medium have been recorded, wherein the contents information recorded on the recording medium is encrypted;
- transmitting at least said identification information read by said reading to said server apparatus each time the content information and unique identification information are read from the recording medium;
- receiving reproducing operation control information to control a reproducing operation of the contents recorded on the recording medium identified by the transmitted identification information; and
- executing reproduction of the contents when the reproducing operation control information received by said receiving is reproducing operation control information to permit reproduction of the contents and inhibiting reproduction of the contents when the reproducing operation control information is reproducing operation control information to inhibit reproduction of the contents, wherein the reproduction expiration stored in a memory at the server apparatus is based on the time of first receipt of the identification information at the server apparatus from the terminal apparatus.

11. A server apparatus in a contents reproduction deadline management system constructed by a terminal apparatus and the server apparatus, comprising:
- a network interface configured to communicate with said terminal apparatus through a network;
- a memory configured to store reproduction expiration information indicative of a reproduction expiration of contents information recorded on a recording medium on the basis of at least identification information which is recorded on the memory on which one or more contents information and unique identification information to identify the recording medium have been recorded, wherein the contents information recorded on the recording medium is encrypted and the reproduction expiration stored in the memory is based on the time of first receipt of the identification information from the terminal apparatus;
- a processor configured to discriminate whether the reproduction expiration of the contents information recorded on said recording medium has passed on the basis of said identification information read and transmitted by said terminal apparatus each time the identification information is read by said terminal apparatus and received by said network interface and said reproduction expiration information stored in said memory; and
- a communication controller configured to control said network interface in such a manner that if it is determined by a discrimination result of said processor that said reproduction expiration is not come yet, reproducing operation control information to enable reproduction of said contents information is transmitted by said network interface, wherein the control information enabling reproduction includes key information to decrypt the encrypted content and, if it is determined that said reproduction expiration has passed, the reproducing operation control information to inhibit reproduction of the contents information on said terminal apparatus side is transmitted and the transmission of said key information to said terminal apparatus is inhibited.

12. A non-transitory computer-readable recording medium including a program, which when executed by a server apparatus in a contents reproduction deadline management system constructed by a terminal apparatus and the server apparatus, causes the server apparatus to perform a method comprising:
- discriminating whether a reproduction expiration of contents information recorded on a recording medium has passed on the basis of at least identification information which is read and transmitted by said terminal apparatus from the recording medium on which one or more contents information and unique identification information to identify the recording medium itself have been recorded each time the identification information is read by said terminal apparatus and reproduction expiration information indicative of the reproduction expiration of said contents information recorded on said recording medium on the basis of at least said identification information, wherein the contents information recorded on the recording medium is encrypted and the reproduction expiration stored in the memory is based on the time of first receipt of the identification information from the terminal apparatus; and
- controlling a communicating operation in such a manner that if it is determined by a discrimination result of said discriminating process that said reproduction expiration is not come yet, reproducing operation control information to enable reproduction of said contents information is transmitted, wherein the control information enabling reproduction includes key information to decrypt the encrypted content and, if it is determined that said reproduction expiration has passed, the reproducing operation control information to inhibit reproduction of said contents information on said terminal apparatus side is transmitted and the transmission of said key information to said terminal apparatus is inhibited.

* * * * *